(12) United States Patent
Yokoi

(10) Patent No.: US 7,388,821 B2
(45) Date of Patent: Jun. 17, 2008

(54) INFORMATION RECORDING DEVICE

(75) Inventor: Kenya Yokoi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 11/270,636

(22) Filed: Nov. 10, 2005

(65) Prior Publication Data

US 2006/0146670 A1    Jul. 6, 2006

Related U.S. Application Data

(63) Continuation of application No. 10/337,268, filed on Jan. 7, 2003, now Pat. No. 7,006,419.

(30) Foreign Application Priority Data

Jan. 8, 2002    (JP)   ............................. 2002-001685

(51) Int. Cl.
     *G11B 7/0045*    (2006.01)
     *G11B 7/125*    (2006.01)
(52) U.S. Cl. .................. 369/59.11; 369/47.53
(58) Field of Classification Search ........................ None
See application file for complete search history.

(56) References Cited

U.S. PATENT DOCUMENTS

| | | | |
|---|---|---|---|
| 4,984,873 A | 1/1991 | Takiguchi et al. |
| 5,056,896 A | 10/1991 | Iimura et al. |
| 5,323,366 A | 6/1994 | Watada et al. |
| 5,732,062 A | 3/1998 | Yokoi et al. |
| 5,956,313 A | 9/1999 | Maegawa et al. |
| 6,246,661 B1 | 6/2001 | Toda et al. |
| 6,426,929 B1 | 7/2002 | Watabe et al. |
| 6,459,666 B1 | 10/2002 | Yokoi |
| 6,487,149 B1 | 11/2002 | Yokoi et al. |
| 6,496,459 B2 | 12/2002 | Ueki |
| 6,600,712 B1 | 7/2003 | Masui et al. |
| 6,819,644 B2 * | 11/2004 | Sasaki et al. ............ 369/59.12 |
| 2002/0085470 A1 | 7/2002 | Yokoi |
| 2002/0196324 A1 | 12/2002 | Abe et al. |

FOREIGN PATENT DOCUMENTS

| | | | |
|---|---|---|---|
| EP | 1 207 525 A2 | 5/2002 |
| JP | 04-053033 A | 2/1992 |

(Continued)

*Primary Examiner*—Craig A. Renner
*Assistant Examiner*—Michael V Battaglia
(74) *Attorney, Agent, or Firm*—Dickstein Shapiro LLP

(57) ABSTRACT

An information recording device comprising at least a recording pulse generating means and a recording pulse selecting means capable of generating various multi-pulses each of which is a combination of a leading heating pulse and a succeeding heating pulse, and rectangular pulses each of which is a single pulse, as a recording pulse, is disclosed. The recording pulse selecting means switches and selects among the multi-pulses and the rectangular pulses according to a recording condition, and then causes a light emission of a laser light source through a light source driving means. Even though in a high recording linear velocity recording condition that is insufficient in power for the recommended multi-pulse recording, a very low recording power can still be used by switching to the rectangular pulse recording, so as to achieve a recording with a much higher recording speed. In addition, good recording marks can be formed without exceeding a maximum allowable recording power.

4 Claims, 7 Drawing Sheets

FOREIGN PATENT DOCUMENTS

| | | |
|---|---|---|
| JP | 06-012674 | 1/1994 |
| JP | 08-180413 | 7/1996 |
| JP | 09-288827 | 11/1997 |
| JP | 10-222874 | 8/1998 |
| JP | 11-007645 | 1/1999 |
| JP | 2001-155339 | 6/2001 |
| JP | 2001-176073 | 6/2001 |
| JP | 2003-173530 | 6/2003 |

* cited by examiner

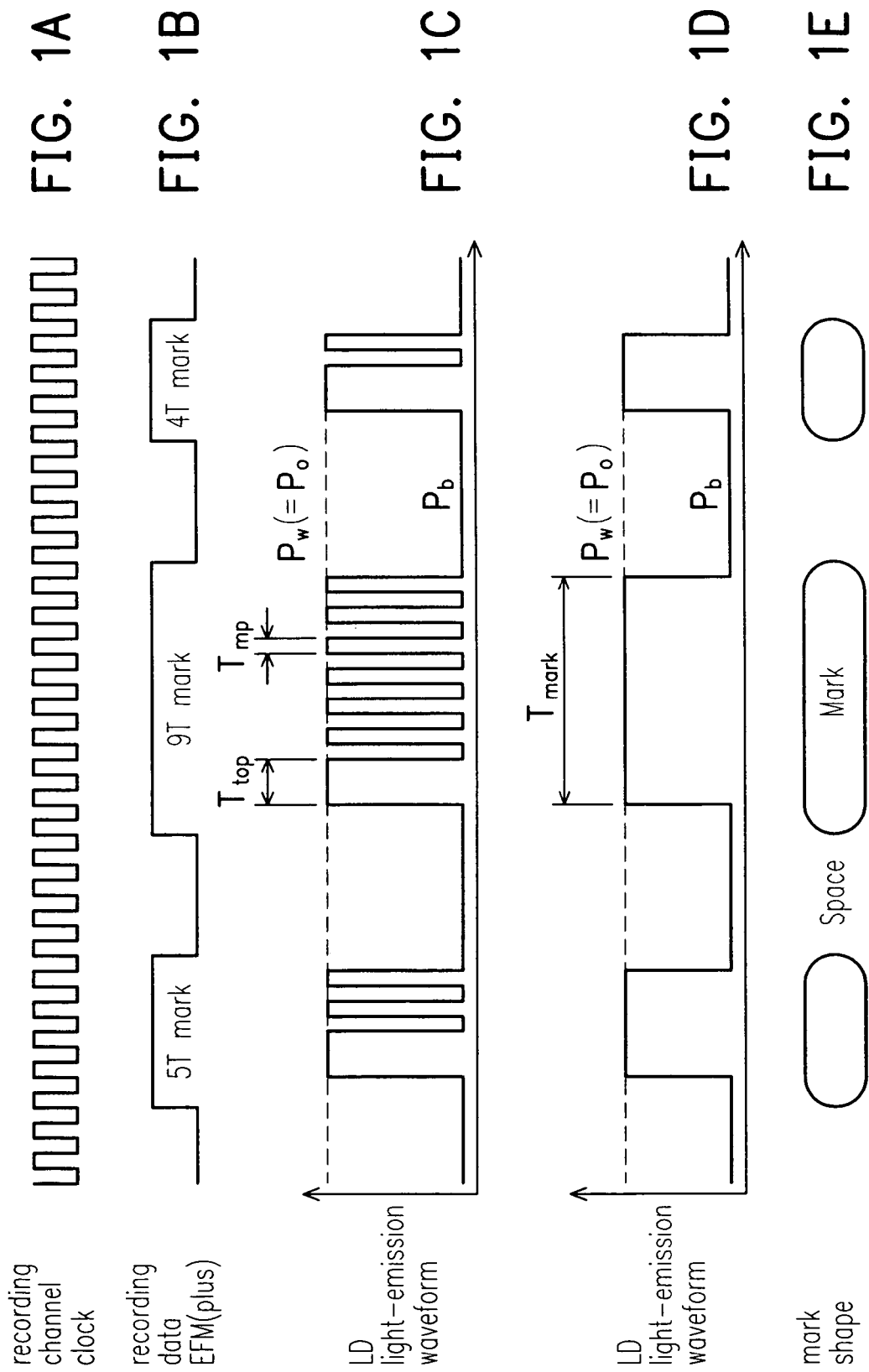

INFORMATION RECORDING DEVICE

CROSS-REFERENCE TO RELATED APPLICATIONS

The present application is a continuation of U.S. application Ser. No. 10/337,268, filed Jan. 7, 2003 now U.S. Pat. No. 7,006,419, the disclosure of which is herewith incorporated by reference in its entirety. This application claims the priority benefit of Japanese application serial no. 2002-001685, filed on Jan. 8, 2002.

BACKGROUND OF THE INVENTION

1. Field of the Invention

This invention relates in general to an information recording device for an optical disc medium, for example, a reproduction-only DVD (digital video disc, or disc versatile disc) medium such as a DVD-Video or a DVD-ROM, or a DVD-Recordable (DVD-R) with format exchangeability.

2. Description of Related Art

As multimedia gets more popular than ever, reproduction-only medium such as DVD-Video or DVD-ROM, or information recording medium such as write-once-type DVD-R using coloring matter as a recording layer is developed.

Information (sector, for example) recorded on such DVD medium is a format as shown in FIG. 9A. As shown in FIG. 9D, in this format, data is continuously recorded with a constant linear density on the whole track of the medium. Conventionally, the controlling method for the rotational velocity of the information recording medium uses a CLV (constant linear velocity) manner as shown in FIG. 9B to make the reproduction-only medium or the information recording medium with the exchangeability format. The rotational velocity of the medium is controlled in a manner that the rotational number is inversely proportional to the track radius. Information is recorded with a constant frequency of a recording channel clock, while the linear velocity of the track is constant.

When the recording is performed in the CLV manner, the recording can be done with different speeds by varying a predetermined recording linear velocity with a fixed magnifying power. In general, the standardized optical recording medium is specified by a predetermined recording linear velocity. For DVD-R, one-fold speed corresponds to a recording linear velocity of 3.49 m/sec and the recording clock frequency is 26.16 MHz. In an information recording device using such an optical recording medium, new recording conditions are set inside the information recording device for setting a higher recording speed, but it is necessary to use an independent recording manner to record information such that the reproducing signals have a low jitter characteristic.

However, in general, for the DVD-R medium of coloring matter system where the marks (pits) are formed according to the heating mode, because the pulse width and the recording power of the recording pulse caused by light-emission during the recording for each particular recording linear velocity are different in the optimum values, the status of the formed marks or spaces are changed for different recording linear velocity.

Namely, a condition where an insufficient amount of heat for the leading heating portion to form the mark occurs, and the heating temperature to reach an optimum decomposition temperature is different, so that the average length of the mark is spread in a wide range. Therefore, the ratio to the recording clock period T of the optimum heating pulse is different and therefore a uniform mark width cannot be obtained. As a result a thin or thick mark (i.e., tear-shaped mark) is created, so that the jitter characteristic degrades.

In this regard and according to Japanese Laid open Publication No. 2001-155339, when the recording onto an optical disc of coloring matter system (such as a DVD-R) is performed, a rectangular pulse is essentially used. At this time, the recording power and the light-emission pulse width are changed according to the recording linear velocity.

In addition, according to Japanese Laid Open No. 2001-176073, when the optical disc of coloring matter system as DVD-R is recorded, a rectangular pulse is used. At this time, two kinds of recording power levels and the light-emission pulse width only when the mark length is shortest are changed according to the recording linear velocity.

This recording method is effective in lowering recording lower for the optical disc of coloring matter system. However, for the recommended recording linear velocity, the multi-pulse recording is determined according to the specification. It does not consider the recording waveform with respect to the variation of the optimum recording power that is caused by the wavelength shift of the light source due to the recordable speed or the temperature variation in the device of the information recording device.

Namely, the above cases provide a control in a manner that setting values of elements of a recording pulse train, such as the light-emission pulse's duty ratio etc., are variable according to the recording linear velocity. However, there is a limitation in the settings of the pulse widths and the allowable values of the recording powers that the information recording device sets. Even though the settings are based on the recording condition assigned by pre-formatted information of the optical disc medium, there is difficulty in setting the optimum recording condition.

Namely, when the recording sensitivity of DVD-R, etc. using coloring matter is reduced because the wavelength of the output laser beam shifts to the long wavelength side, the optimum recording power obtained by the test writing, etc. is deviated by the wavelength shift, so that a good recording is difficult to obtain. In addition, even though a correction function for the recording power according to the mark forming status during the recording, a so-called Running-OPC (Running-optimum power calibration), is used, the sensitivity reduction due to the wavelength shift is created about 3% per 1 nm.

SUMMARY OF THE INVENTION

According to the foregoing description, an object of this invention is to provide an information recording device, wherein as compared with an optical recording medium where a light-emission waveform of a multi-pulse is previously assigned as a recording pulse, and even though the recording condition is insufficient in power for the multi-pulse recording, the information recording device is capable of selecting a light-emission waveform of a recording pulse that is able to form a good recording mark without exceeding the maximum allowable power of the information recording device.

Another object of this invention is to provide an information recording device capable of preventing a reduction in the recording quality or a recording inability, which is caused by the insufficient power, according to the characteristic of the optical recording medium by predicting a required recording power from an optimum recording power obtained by the test writing.

Another object of this invention is to provide an information recording device capable of predicting a sensitivity reduction of the optical recording medium of coloring matter system according to a wavelength variation during the recording or a shift toward the long wavelength side that is caused by the wavelength unevenness of the laser light source or the rising of the internal temperature in the information recording device, so as to be able to change the light-emission waveform of the recording pulse.

According to at least the objects mentioned above, the present invention provides an information recording device, for recording an optical recording medium having a recording layer, where recording information is formed thereon as a mark, by irradiating a laser beam with a light-emission waveform corresponding to a recording pulse. The information recording device comprises a rotation driving mechanism, for rotating the optical recording medium; a rotation controlling means, for controlling a rotation operation of the optical recording medium due to the rotation driving mechanism, according to an assigned recording linear velocity; a laser light source, for emitting the laser beam; a light source driving means, for causing a light emission of the laser light source; a recording pulse generating means, capable of generating each rectangular pulse of a single pulse and each multi-pulse with a combination of a leading heating pulse and a succeeding heating pulse, any one of which is as the recording pulse; and a recording pulse selection means, for switching and selecting the multi-pulse and the rectangular pulse according to a recording condition, so as to let the laser light source emit light through the light source driving means.

Therefore, for example, even though during the recording condition where a high-speed recording linear velocity, the recording power will be insufficient for recording by the recommended multi-pulse, a very low recording power can be still used by switching to a recording with the rectangular pulse, so that a higher recording speed can be achieved.

In the above information recording device, the recording pulse selection means uses a recording linear velocity as the recording condition. When recording with a low recording linear velocity within a range lower than the recording linear velocity that is preset to the optical recording medium as an object, the multi-pulse is selected. When recording with a high recording linear velocity within a range higher than the preset recording linear velocity, the rectangular pulse is selected.

Therefore, when recording at a range of low recording linear velocity lower than the recording linear velocity preset to the optimum recording medium as an object, the recording is performed with the recommended multi-pulse. However, when recording with high recording linear velocity higher than the preset recording linear velocity, although the recording power will be insufficient for recording by the recommended multi-pulse, a very low recording power can be still used by switching to a recording with the rectangular pulse, so that a high speed recording that exceeds the recording linear velocity preset to the optimum recording medium can be achieved.

The above information recording device further comprises a velocity information acquiring means, for acquiring a maximum recording linear velocity for the optical recording medium based on setting values of pulse widths and recording powers for the multi-pulse corresponding to a predetermined recording linear velocity for the optical recording medium as an object, which are pre-formatted as the recording condition. When recording at a high recording linear velocity that exceeds the maximum recording linear velocity obtained by the velocity information acquiring means, the rectangular pulse is selected.

Accordingly, from the recording condition of the pulse width or recording powers for the multi-pulse that are pre-formatted on the optical recording medium as an object, the predetermined maximum recording linear velocity of the optical recording medium is acquired. When recording to the optical recording medium with the high recording linear velocity that exceeds the maximum recording linear velocity, to record with a higher speed is possible by selecting the rectangular pulse to record.

The information recording device can further comprises a rectangular pulse calculation means and a rectangular test writing means. The rectangular pulse calculation means is used for calculating a pulse width and recording powers for the rectangular pulse at the recording linear velocity that exceeds the predetermined recording linear velocity, based on the setting values of the pulse width and the recording powers for the multi-pulse corresponding to the predetermined recording linear velocity for the optical recording medium as the object that are pre-formatted as the recording condition, when the rectangular pulse is selected by the recording pulse selection means. The rectangular test writing means is used for performing a test writing to the optical recording medium by using different powers at the recording linear velocity based on calculated values obtained by the rectangular pulse calculating means, so a to acquire an optimum recording power for rectangular pulse recording. Therefore, a recording is performed by using the rectangular pulse corresponding to the optimum recording power obtained by the rectangular test writing means.

Therefore, even for the optical recording medium where the preset recording linear velocity is set and the recording condition using the multi-pulse is used, the optimum recording power can be easily and properly calculated for a situation that the rectangular pulse is used and the recording with a much higher recording linear velocity is performed.

The information recording device further comprises a recording condition acquiring means, a test writing means, and a determining means. The recording condition acquiring means is used for reading setting values of pulse widths and recording powers for the multi-pulse corresponding to a predetermined recording linear velocity for each optical recording medium as an object, which are pre-formatted as the recording condition. The test writing means is for performing a test writing to the optical recording medium with different recording powers at the predetermined recording linear velocity based on the read setting values of the pulse widths and the recording powers for the multi-pulse, so as to obtain an optimum recording power for recording with the multi-pulse. The determining means, for determining whether the optimum recording power obtained by the test writing means exceeds a predetermined maximum allowable power. Therefore, the recording pulse selection means uses the recording powers as the recording condition, and when the optimum recording power exceeds the predetermined maximum allowable power, the rectangular pulse is selected to replace the multi-pulse.

Therefore, for the recording by using the multi-pulse, even though the optimum recording power obtained by recording with the test writing exceeds the maximum allowable power, by switching to the recording with the rectangular pulse, the insufficient power when recording with the multi-pulse is avoided, a low recording power with the rectangular pulse can be used, and an ill recording at high speed recording can be avoided.

The information recording device further comprises a temperature detecting means for detecting a temperature near the laser light source in the information recording device, wherein the recording pulse selecting means uses temperature information in the information recording device that is detected by the temperature detecting means as the recording condition.

Therefore, considering the temperature near the laser light source in the information recording device, when the recording sensitivity of the optical recording medium reduces due to the wavelength shift to the long wavelength side, i.e., the temperature dependency of the laser light source, the insufficient power when recording with the multi-pulse can be avoided and an ill recording at high speed recording can be avoided by switching the multi-pulse recording to the rectangular pulse recording.

The information recording device further comprises a temperature detecting means, a recording condition acquiring means, a test writing means, a recording power rising calculation means, and a determining mean. The temperature detecting means is used for detecting a temperature near the laser light source in the information recording device. The recording condition acquiring means is used for reading setting values of pulse widths and recording powers for the multi-pulse corresponding to a predetermined recording linear velocity for each optical recording medium as an object, which are pre-formatted as the recording condition. The test writing means, for performing a test writing to the optical recording medium with different recording powers at the predetermined recording linear velocity based on the read setting values of the pulse widths and the recording powers for the multi-pulse, so as to obtain an optimum recording power for recording with the multi-pulse. The recording power rising calculating means is used for calculating a rising value of the optimum recording power obtained by the test writing means based on a temperature difference between a preset maximum allowable temperature and the temperature in the information recording device that is detected by the temperature detecting means. The determining means is sued for determining whether the optimum recording power added with the rising value obtained by the recording power rising calculating means exceeds a predetermined maximum allowable power. The recording pulse selection means uses the recording powers as the recording condition, and when the optimum recording power added with the rising value obtained by the recording power rising calculation means exceeds the predetermined maximum allowable power, the rectangular pulse is selected to replace the multi-pulse.

Therefore, even though the optimum recording power obtained by the test writing recording is below the maximum allowable power, one can predict that the recording power for the multi-pulse recording will be insufficient because of the reduction of the recoding sensitivity of the optical recording medium due to the long wavelength shift caused by the temperature dependency of the laser light source. In this situation, an ill recording at a high-speed recording can be avoided by previously switching to the rectangular pulse recording to use the lower recording power of the rectangular pulse.

The above information recording device further comprises an information storage means for previously storing relationship information between an approximation equation representing a relationship between the temperature near the laser light source in the information recording device and a wavelength of the laser light source or a variation amount of the wavelength to a temperature variation, and a temperature dependency of the recording power of the optical recording medium or a variation amount of the recording power to the temperature variation. The recording power rising calculation means calculates the rising value based on the temperature difference between the preset maximum allowable temperature and the temperature in the information recording device that is detected by the temperature detecting means and said relationship information stored in the information storage means.

Accordingly, the wavelength variation due to the temperature dependency of the laser light source can be properly calculated. The variation of the recording sensitivity due to the wavelength variation of the optical recording medium can be calculated as a variation amount of the recording power. In addition, the rising value corresponding to the optimum recording power obtained by the test writing can be calculated from the detected temperature in the information recording device.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 1A to 1E are diagrams of pulse waveforms showing a multi-pulse recording and a rectangular pulse recording according to one embodiment of the present invention;

FIGS. 2A to 2C are waveform diagrams showing an example of a correction process for the rectangular pulse recording;

DESCRIPTION OF THE PREFERRED EMBODIMENT

Figures 2A, 2B, 2C:
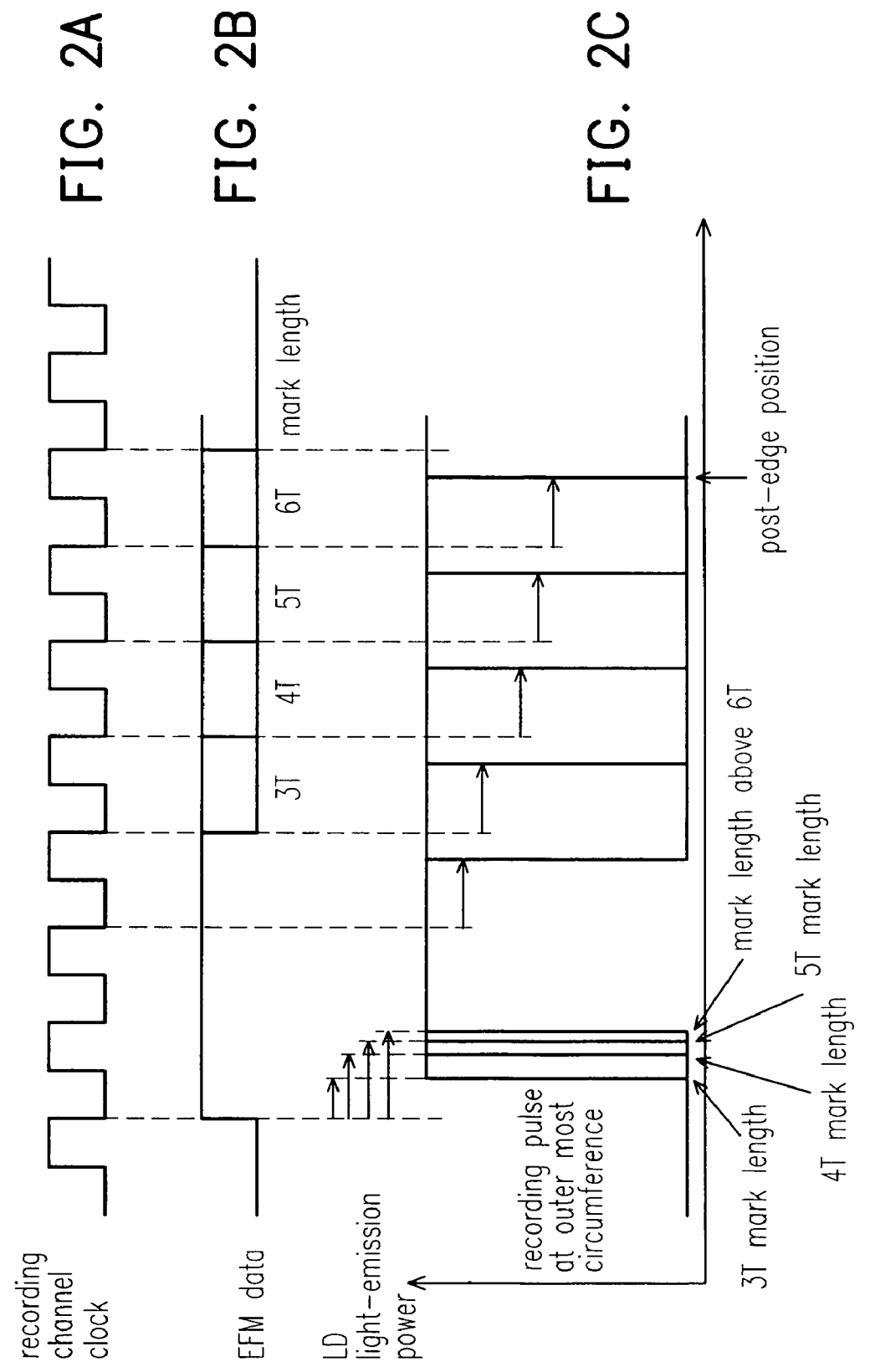
Figure 3:
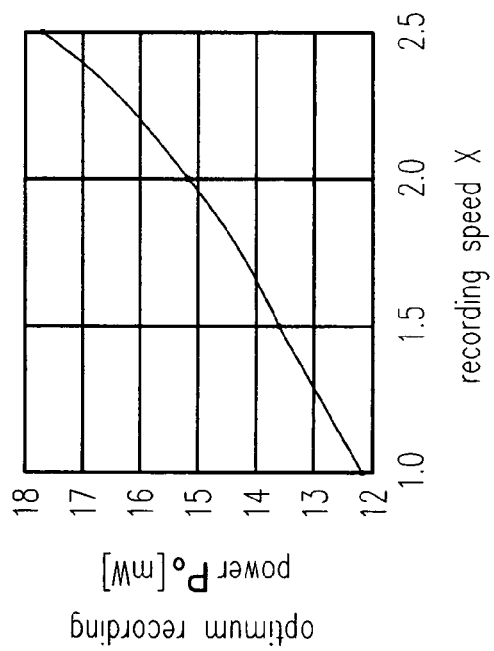
FIG. 3 is a characteristic diagram showing a recording fold speed dependency of an optimum recording power.

The embodiment of the invention is described in detail accompanying with the attached drawing FIGS. 1A~9D. First, information recording method, which is suitable for the information recording device of the embodiment of the present invention, is described.

Recording Method I

In the embodiment, the write-once type optical disc using coloring matter, such as DVD-R, is used as an optical recording medium that is an object to the recorded. In addition, a multi-pulse is assumed to use as the recommended recording pulse.

Referring to FIG. 1C, as a basic recording pulse using for the optical recording medium such as DVD-R, a recording pulse train with respect to each mark data length nT as shown in FIG. 1B (where T represents the period of the recording channel clock and n is a nature number. For the EFM (plus)

modulation, n=3~11, 14.) is constructed by a multi-pulse that comprises a leading heating pulse portion and a plurality of succeeding heating pulse portions. The setting for the pulse width of the heating pulse is as a ratio with respect to the period T of the recording channel clock, in which the leading heating pulse is Ttop and the succeeding heating pulse portions are Tmp. In addition, the setting for the recording power Pw is that the leading heating pulse portion and the succeeding heating pulse portion are the same. At this time, the optimum recording power for the predetermined recording linear velocity is Po.

The recording condition can be obtained by reading pre-formation information that the DVD-R disc is pre-formatted in advance according to a wobble signal or an LPP signal. The wobble signal is separated and detected by using a band pass filter (BPF) from a push-pull signal that is obtained by making the track groove of the DVD-R disc to serpentine. The LPP signal is obtained by demodulating a modulation signal of land pre-pit that is formed by dividing the track groove. For the ordinary DVD-R disc, Ttop≈1.35 T, Tmp≈0.60T, and Po≈9.5 mW. These recording method and recording conditions are standardized and designed to satisfy all characteristics of the DVD-R disc completely.

For the DVD-R that the multi-pulse recording is recommended, the information recording device is able to use an individual recording pulse train to record. For example, as shown in FIG. 1D that is recommended for the CD-R disc, the recording pulse train with respect to each mark data length nT is a recording manner that uses rectangular pulses each of which comprises a single pulse. For fitting the rectangular pulse to the DVD-R disc, the pulse width Tmark or the optimum recording power Po has to use individually optimized setting values. In general, for the ordinary DVD-R disc, Tmark≈(n−1.2) T and Po≈7.8 mW.

As shown in FIG. 2, for the recording by using the rectangular pulse, the pre-edge position and the post-edge position of the pulse width Tmark for each data length nT are corrected by a predetermined amount, so that the edge shift, which is created by heat accumulation effect etc due to the mark and the space data length, is corrected. The correction of the edge shift is to optimize at each recording linear velocity and to optimize each combination of immediately before or immediately after space length and mark length. Recording with further lower jitter can be performed by using any generating method for the multi-pulse and the rectangular pulse.

When the 2.5-fold speed recording is performed on a typical DVD-R disc, the aforementioned correction values for each correction position shown in FIGS. 2A~C are set as Table I.

TABLE I

| pre-edge position | | 3T | 4T | 5T | 6-14T |
|---|---|---|---|---|---|
| immediately before space length | 3T | 0.45 | 0.7 | 0.8 | 0.85 |
| | 4T | 0.4 | 0.6 | | 0.7 |
| | 5T | | | | |
| | 6T-14T | | | | |

TABLE II

| post-edge position | | 3T | 4T | 5T | 6-14T |
|---|---|---|---|---|---|
| immediately after space length | 3T | 0.7 | 0.75 | | 0.7 |
| | 4T | | | 0.4 | |
| | 5T | | | 0.25 | |
| | 6T-14T | | | 0.15 | |

Regarding the optimum recording power Po, the status of mark formation relates strongly to the recording linear velocity Lv. It is well known that as the recording linear velocity gets larger, the optimum recording power Po increases in a manner that is substantially proportional to the recording linear velocity Lv (i.e., the recording fold speed is also equivalent. For the recording fold speed, the standard recording linear velocity is one-fold speed). If the standard recording linear velocity of the DVD-R disc, 3.5 m/s, is one-fold speed, then for the recording by using multi-pulse, Po can be approximately met by the following equations: $Po = k \times \sqrt{Lv}$, or $Po = k' \times \sqrt{X}$ (where k, k' are constants, and X is the fold speed). For example, for the aforementioned multi-pulse, k=5.1 or k'=9.5.

In addition, for the optical pick-up used in the information recording device for the DVD-R disc, if the maximum output power of the semiconductor laser diode (LDS) is 50 mW, 30% of it, i.e., 15 mW is used as the optimum recording power that can be regularly used. In the recording process using multi-pulse, because the optimum recording power Po to the aforementioned recording fold speed X varies in a manner as shown in FIG. 3 (LD wavelength=668 nm), the optimum recording power Po is over the maximum value of the optical pick-up, 15 mW, at two-fold speed.

Figure 4:
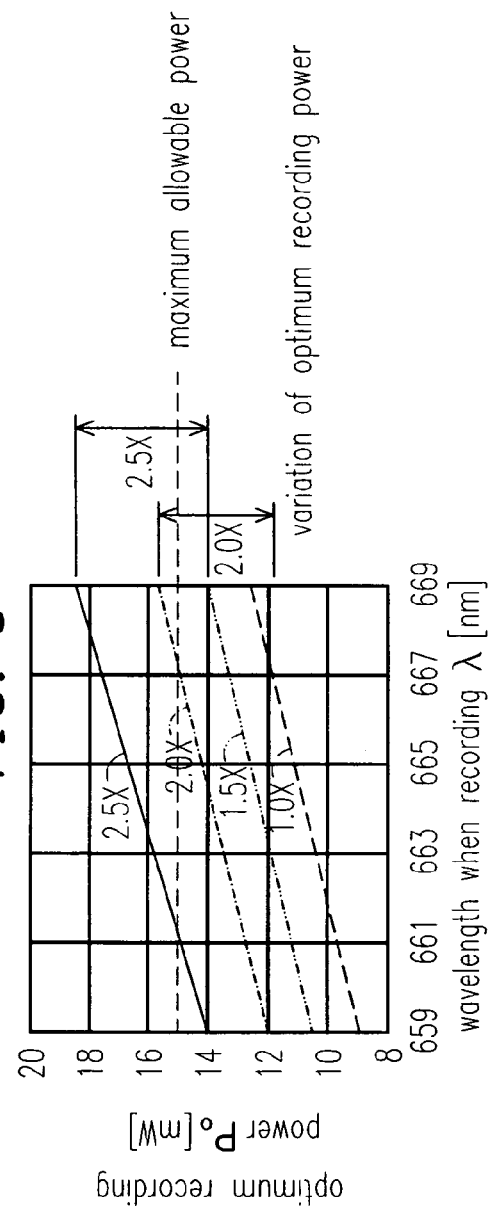
FIG. 4 is a characteristic diagram showing a wavelength dependency of an optimum recording power for the multi-pulse.
Figure 5:
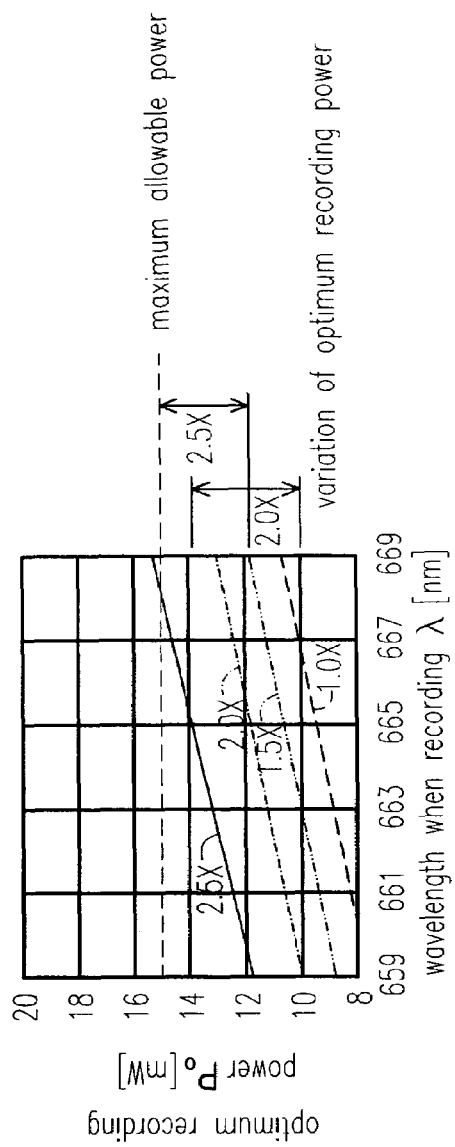
FIG. 5 is a characteristic diagram showing a wavelength dependency of an optimum recording power for the rectangular pulse.

Referring to FIG. 4, in the recording method I of the embodiment, when recording at a recording fold speed region of a low speed side less than 2-fold speed whose optimum recording power does not exceed the maximum value of 15 mW, i.e., one-fold speed and 1.5-fold speed, the recommended multi-pulse is used to record, and when recording with a recording speed above 2-fold speed, the recording is switched from the recommended multi-pulse recording to the rectangular recording, so that the optimum recording power does not exceed the maximum value of 15 mW. In this way, as shown in FIG. 5, to record with a higher speed can be achieved.

Namely, as the recording pulse used for recording, to be able to generate the multi-pulse of combining the leading heating pulse and the succeeding heating pulse and the rectangular pulse formed by single pulses is prepared. Accordingly to the recording linear velocity (or the recording fold speed) that is used as the recording condition, the recording by the multi-pulse and the recording by the rectangular pulse are switched and selected. When the recording is performed within a range of low recording fold speed lower than or equal to 1.5× that is preset for each DVD-R disc as an object, the multi-pulse is used. When the recording is performed within a high recording fold speed higher than or equal to the preset recording fold speed of 1.5×, the rectangular pulse is used.

Recording Method II

Regarding the aforementioned DVD-R disc, because the coloring matter used as the recording layer for each maker is different, the optimum recording power Po at the predetermined recording fold speed and the sensitivity to the wavelength of the semiconductor laser diode (LD) are different. In additional, the wavelength of the semiconductor laser diode (LD) might be uneven, for example, 660 nm±5 nm. Therefore, the wavelength of the laser beam that the semiconductor laser diode (LD) emits is shifted because of the internal temperature of the information recording device.

The optimum recording power Po is different for each combination of the information recording device and a particular DVD-R disc. Therefore, at the preparation stage of recording, using a test writing region arranged at a predetermined radius position, to record by the test writing is performed with different recording powers stepwise starting from a low power to a high power level. Then, by reading data from the test writing region, the optimum recording power that is actually used is determined.

At this time, in the case that the DVD-R disc whose recording sensitivity is high or the wavelength dependence is small is used, even though the recording fold speed is above 2-fold speed, an optimum recording power Po with a sufficiently low value can be obtained. Therefore, the recording by using the recommended multi-pulse can be executed. In contrast, in the case that the DVD-R disc whose the recording sensitivity is low or the wavelength dependence is large is used, when the test writing is performed with a recording fold speed above 2-fold (2×), the obtained optimum recording power Po might exceed the maximum allowable power (15 mW in this example) of the optical pick-up. Therefore, if the recording with the optimum recording power by using the multi-pulse is straightly performed, the lifetime of the semiconductor laser diode (LD) is reduced and damage to the semiconductor laser diode (LD) will occur. Because the power becomes insufficient as the recording power reduces, the jitter characteristic of the reproduction signal gets worse and a good recording disc cannot be obtained.

In the recording method II of this embodiment, when the optimum recording power Po obtained by the test writing exceeds the maximum allowable power, a good recording can be achieved by switching the recording from using the multi-pulse to using rectangular pulse.

For example, the test writing is performed under a condition that a DVD-R disc made by a specified maker is used and the wavelength of the laser beam from the semiconductor laser diode during the recording is 668 nm. In the case that the optimum recording power Po is calculated as 15 mW as shown in FIG. 4, as the recording by using the initial set multi-pulse is performed, the output that exceeds the maximum allowable power (15 mW) of the optical pick-up is regularly used due to the recording power variation or power control of R-OPC, etc., which causes malfunction of the semiconductor laser diode (LD). When an optimum recording power Po that exceeds the maximum allowable power is obtained, at this time, the recording is changed from using the multi-pulse to using the rectangular pulse. Then, the test writing is executed again to calculate an optimum recording power Po for he rectangular pulse. This optimum recording power Po is 12.5 mW as shown in FIG. 5, and therefore, a sufficiently low power suitable for the semiconductor laser diode (LD) is possible. For general coloring matter, about 15%~20% of the optimum recording power Po can be reduced by changing to use the rectangular pulse. Therefore, the 2-fold speed or 2.5-fold speed recording, which is difficult for the multi-pulse, can be performed.

Recording Method III

A recording condition, i.e., setting values of the pulse width of the multi-pulse and the optimum recording power, etc. are read from pre-formatted information obtained by modulating a LPP signal that is separated and detected from a push-pull signal in pre-formatted information that is pre-formatted for each DVD-R disc. At this time, when a recording fold speed, which is determined that the optimum recording power Po for 2.5 fold-speed is obviously insufficient as a recording fold speed (recording linear velocity) during the recording, is set, a converting table that is prepared in advance is then used to calculate setting values of the pulse with Tmark of the rectangular pulse based on the read setting values of the multi-pulse. The converting table is stored in a recording condition storage part placed in the information recording device. In addition, the optimum recording power Po is multiplied by a coefficient (about 0.85~0.80) to calculate an optimum recording power for the rectangular pulse. Next, the setting vale is used to set the test writing power with eight steps from the low power to the high power, so as to execute the test writing onto a PCA portion arranged in the innermost circumference region of the DVD-R disc. Next, an asymmetry ($\beta$ value, $\beta$=(RFpeak+RFbottom)/(RFpeak−RFbottom)) of the RF signal after combining the AC component at each power region is detected from the reproduction signal, and then the optimum recording power Po is obtained by calculating the recording power of the target $\beta$ value ($\beta$ target≈0). By obtaining the setting value for the recording condition of the rectangular pulse, even though for the high-speed recording fold that is impossible for the recording by using the multi-pulse, a good recording can be obtained without damaging the semiconductor laser diode (LD).

Recording Method IV

First, as shown in FIGS. 4 and 5, regarding the DVD-R disc using coloring matter as the recording layer, because he characteristic of the recording sensitivity varies according to the variation of the wavelength of the laser beam of the semiconductor laser diode (LD), the optimum recording power is shifted to a large value because of the wavelength deviation of the semiconductor laser diode (LD) used in the information recording device, i.e., because of the wavelength being shifted to the long wavelength side. Furthermore, due to the internal temperature of the information recording device, i.e., the temperature rise at the peripheral regions of the semiconductor laser diode (LD), the wavelength of the laser beam of the semiconductor laser diode (LD) is also shifted towards the large value side. Therefore, the optimum recording power is shifted to the large-value side because of the rising of the internal temperature of the information recording device.

Figure 6:
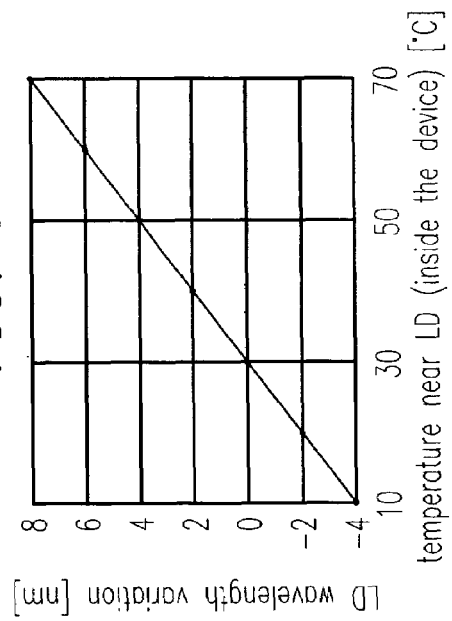
FIG. 6 is a characteristic diagram showing a temperature dependency of a LD wavelength variation.
Figure 7:
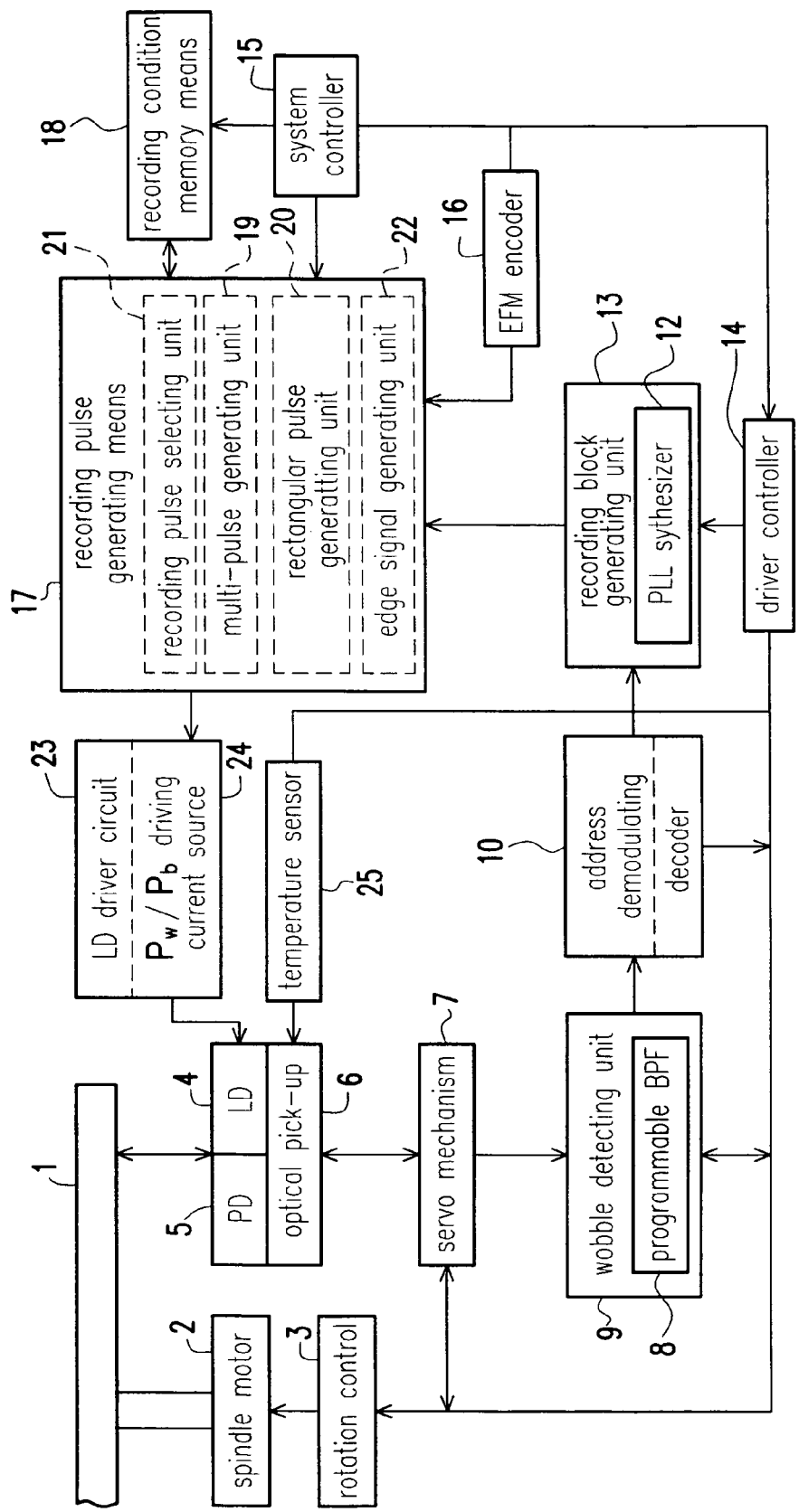
FIG. 7 is a block diagram showing an exemplary structure of an information recording device according to the embodiment of the present invention.

According to the wavelength variation of the laser beam, even though the calculated result of the optimum recording power Po from the test writing is a proper value at a temperature at that time, the optimum recording power Po is still increasingly or decreasingly varied due to the internal temperature variation. In general, after the power of the information recording device is turned on, the temperature rise from the room temperature to about 60° C. because of heat generated by the semiconductor parts and the semiconductor laser diode (LD) for a long time recording, which shows a temperature rising extent of above or equal to 30° C. FIG. 6 shows a temperature dependency of the LD wavelength variation, using 30° C. as a reference.

Therefore, a temperature sensor is installed in the vicinity of the optical pick-up (or the semiconductor) of the information recording device to detect the internal temperature at a point of test writing. Under a situation that such a temperature detection is performed and the internal temperature rises to a very high temperature, when the optimum recording power is a small value at the time point of test writing, the recording is performed by using the recommended multi-pulse. However, when the internal temperature at this time is low and the optimum recording power is high, the LD wavelength shifts to the long-wavelength side in response to the rising of the internal temperature once the recording using the multi-pulse is performed. Therefore, when the detected internal temperature is a low temperature, by changing the recording from using the multi-pulse to using the above rectangular pulse, a good recording can be performed without exceeding the maximum allowable power.

By calculating a difference between the internal temperature detected at the point of test writing and the maximum allowable temperature that is previously set by the information recording device and by a maximum temperature rising value obtained from the beginning of the recording, the shifting amount toward the long wavelength side of the wavelength of the laser beam is calculated. In general, the wavelength shift due to the temperature rising of the LD is +0.2 nm/+1° C., and the rising of the optimum recording power of the DVD-R due to the wavelength shift is +3%/+1 nm. Therefore, from those variation coefficients, for example, if the optimum recording power obtained from the test writing is 13 mW and the maximum allowable temperature is 60° C. when the internal temperature is 30° C., the wavelength shift is +6 nm and the rising value of the optimum recording power varies to a maximum value of 15.3 mW due to 18% rising. As the maximum value adding the rising value exceeds the maximum allowable power 15 mW, the recording cannot be performed by using the multi-pulse. From the above result, as shown in FIGS. 4 and 5, by changing to the recording with the rectangular pulse, about 16% of the optimum recoding power Po is reduced. Therefore, even though the internal temperature rises to the maximum value (60° C.), the semiconductor laser diode (LD) is not damaged and a good quality recording can be obtained.

The relationship between the internal temperature and LD wavelength can be represented by the "variation amount", and alternatively, can be also represented by "first order approximate equation" with a tilt relation, as shown in FIG. 6. Namely, the relationship between the device internal temperature detected from the periphery of the device or nearby the laser beam source and the wavelength of the laser beam source is a proper characteristic of the installed laser beam source, and can be represented by a simple approximate equation having a linear approximation. By setting the approximate equation in advance, the variation amount of the wavelength against the temperature variation can be calculated. In addition, as shown in FIGS. 4 and 5, the LD wavelength dependency of the optimum recording power of the DVD-R disc can be also represented by "first order approximate equation" with a tilt relation. The maximum variation amount of the LD wavelength shift and the maximum variation amount of the optimum recording power can be calculated by a difference between the maximum allowable temperature and the internal temperature that is detected by using the two simple approximations. Namely, the wavelength dependency of the recording power of the DVD-R disc also has a proper characteristic according to the used coloring matter. The wavelength dependency can be easily obtained by reading the maker or disc type from a pre-format information of the DVD-R, or by referring to a corresponding data that is previously set. Moreover, by adding the maximum variation amount (the rising value) to the optimum recording power that is obtained by the test writing, whether the optimum recording power exceeds the maximum allowable power of the optical pick-up can be determined.

When the optimum recording power, which is obtained from the test writing according to the internal temperature detection at the time point of the test writing, is much smaller than the allowable power is determined, the multi-pulse recording is selected. When the wavelength shift as compared to the optimum recording power, in consideration of the allowable power and having determined the insufficient power, the rectangular pulse recording is selected. Such a determining process is executed by a software program installed and a CPU that is within a system controller installed within the information recording device, and no special configuration is required. By selecting the rectangular pulse recording, about 20% of recording power can be reduced. Therefore, for a long-time recording such as Disc-At-Once (DAO), a good recording can be achieved without causing any bad recording. In addition, a high-speed recording corresponding to the CAV recording that is equivalent to 2.5-fold speed at the outermost circumference, or the CLV recording with a speed of about 2-fold to 3-fold speed can be achieved.

In addition, each setting value of the above recording condition is a typical value for a DVD-R disc with a special coloring matter and groove structure. However, the DVD-R disc of coloring matter system creates optical changes de to a thermolysis caused by the emission of the laser beam or a substrate deformation caused by the thermolysis. By forming marks with the aforementioned changes, he information recording is performed. When the marks are formed by the heat mode, the embodiment of the present invention is very suitable. For example, the typical organic coloring matters are Polymethine coloring matter, cyanine system, naphthalocyanine system, pthalocyanine system, squalirium system, pyrylium system, naphthoquinone system, anthraquinone (indanthrene) system, xanthene system, triphenylmethane system, azulene system, phenanthrene sytem, triphenothiazine system die, and metal-complex compound of azo system, etc. Other organic coloring matter, metal, or metal compound can be mixed or layered with the coloring matter in order to improve its optical characteristic, recording sensitivity, and signal characteristic, etc. In addition, as an example of the metal and metal compound, In, Te, Bi, Se, Sb, Ge, Sn, Al, Be, TeO2, SnO, As, Cd, etc., can be used, and each can be dispersedly mixed or layered with the coloring matter. An ordinary method, such as evaporation, sputtering, CVD, or solvent coating, can be performed to form the recording layer. When using the coating method, the above colorant, etc dissolves to the organic solvent, and ordinary coating method such as spray coating, roller coating, dipping, and spin coating, etc. can be used.

For the DVD-R discs with various coloring matters, various optimized setting values are different. However, the tendency of variation of the optimum recording power according to the recording linear velocity, the variation of the LD wavelength, or the recording pulse has the same features. Therefore, effects of the present invention can be achieved no matter what kind of optical disc is used.

An exemplary structure of an information recording device for implementing the recording methods I-IV mentioned above is described by referring to FIG. 7. The information recording device of the embodiment is an information recording/reproducing device capable of select a multi-pulse or a rectangular pulse as a recording power, in which the optimum recording power satisfies the maximum allowable power (for example, 15 mW), to record and capable of reproducing.

First, a rotation driving mechanism 3 comprising a spindle motor 2 to rotationally drive an optical recording medium 1 such as a DVD-R disc having a recording layer made from a coloring matter. Additionally, an optical pick-up 6 is further installed to be able to seek and move freely in the disc radius direction. The optical pick-up 6 further comprises an object lens to focus and irradiate the laser beam to the optical recording medium 1, and an optical receiving element for receiving a laser light source of a semiconductor laser diode (LD) 4 or a reflection light from the optical recording medium 1. A driving device of the object lens of the optical pick-up 6 and the output system are connected to a servo mechanism 7. The servo mechanism 7 is connected to a wobble detecting unit 9 comprising a programmable band pass filter (BPF) 8. The wobble detecting unit 9 is connected to an address demodulating circuit 10 to demodulate an address from a wobble signal. The address demodulating circuit 10 is connected to a recording block generating unit 13 comprising a phase locked loop (PLL) synthesizer circuit 12. The PLL synthesizer circuit 12 is connected to a driver controller 14 that functions as a rotation control means to perform a control according to a specified recording linear velocity. In addition, the driver controller 14, which is connected to a system controller 15, is also connected to the rotation driving mechanism 3, servo mechanism 7, the wobble detecting unit 9, and the address demodulating circuit 10. Moreover, the system controller 15 is connected to an EFM encoder 16, a recording pulse generating means 17, and a recording condition memory means that serves as an information storage means.

Detail correction values of the pulse widths that cannot be obtained from pre-format information of the optical recording medium 1 used as an object, detail setting values that relate to the rectangular pulse to be selected when performing a high-speed recording higher than the recommended speed of the disc, and variation amounts or approximation equations of the temperature dependency of laser beam wavelength of the semiconductor laser diode (LD) 4, etc. are stored in the recording condition memory means 18.

For the above structure of the information recording/reproducing device, a groove for obtaining a tracking error signal (a push-pull signal) is formed on the optical recording medium, and a wobble signal that is obtained by wobbling along the groove is overlapped. By demodulating information that is encoded by a frequency modulation or a phase modulation, even for a non-recorded disc, characteristic address information and disc information of the disc can be obtained. For the DVD-R disc, information is generated by demodulating (a Land-Prepit signal) cut intermittent pits of a land portion.

For each recording linear velocity, a central frequency of BPF corresponding to the recording linear velocity is set by the driver controller 14 at the programmable BPF, the wobble signal detected by the wobble detecting unit 9 is demodulated by the address demodulating circuit 10. Additionally, by the driver controller 14, a recording channel clock for any recording linear velocity is generated by the PLL synthesizer circuit 12 that is used to vary a basic frequency, and then the recording channel clock is output to the recording pulse generating means 17.

Next, in order to generate the recording pulse train from the semiconductor laser diode (LD), the recording channel clock and EFM data (as recording information) are respectively input to the recording pulse generating means 17 from the recording block generating unit 13 and the EFM encoder 16, so as to generate a recording pulse controlling signal. In this embodiment, the recording pulse generating means comprises a multi-pulse generating unit 19 for generating a multi-pulse and a rectangular pulse generating unit 20 for generating a rectangular pulse, and this is able to generate the multi-pulse or the rectangular pulse to be the recording pulse. In addition, a recording pulse selecting means 21 is further arranged in the recording pulse generating means 17. Under the control of system controller 15, recording pulse selecting means 21 can select one of the multi-pulses generated by the multi-pulse generating unit 19 and the rectangular pulse generated by the rectangular pulse generating unit 20, to be the recording pulse.

The recording pulse generating means 17 further comprises an edge signal generating unit 22 that is used during the generation of the recording pulse. As the edge signal generating unit 22, a multi-stage delay circuit, which uses gate elements with a delay time of about 0.5 ns, is disposed. However, instead, the edge signal generating unit 22 can be constructed by a PLL comprising a phase comparator, a loop filter, a VCO (voltage controlled oscillator), and a frequency divider. In this structure, a high-resolution clock that is gradually increased from 20 times to 40 times is generated by the PLL synthesizer 12. After the multi-stage edge signal is input to an edge selector that forms the PLL synthesizer 12, the recording pulse controlling signal which is used to vary the pre-edge and pos-edge of the multi-pulse or the rectangular pulse, is generated according to the edge signal selected by the system controller 15.

According to the above structure, a setting value of the recording pulse (i.e., the multi-pulse or the rectangular pulse), which is selected in a manner that the optimum recoding power Po satisfies the maximum allowable power, is determined, and then the information recording device can be operated in a manner that the desired light-emission waveform for recording is obtained.

In the LD driver circuit 23 serving as a light source driving means, the driving current sources 24 of the recoding power Pw and he bias power Pb is switched according to the recording pulse that is output from the recording pulse generating means 17, and thereby, the light-emission waveform as shown in FIG. 1C or 1D can be obtained.

Furthermore, a temperature sensor 25, as a temperature detecting means, is installed to detect an internal temperature of the device in the vicinity of (nearby or at the periphery of) the semiconductor laser diode (LD) 4. In this way, temperature information is transmitted to the system controller 15 through the driver controller 14. Moreover, to detect the internal temperature, it is highly desired to get the temperature nearby the semiconductor laser diode (LD) 4, so that the temperature sensor 25 is installed nearby the semiconductor laser diode (LD) 4 in the optical pick-up 6. As the temperature sensor 25, in addition to using the temperature measuring resistor, the thermistor chip or the thermocouple, etc., the temperature can also be detected by using a voltage drop between the base and the emitter of a transistor, or by using a temperature draft of an amplifier, etc.

In the above structure, when the recording method I is used, if the assigned recording linear velocity is used to record with a low recording fold speed with a range below a recording fold speed 1.5× that's preset to each optical recording medium 1 as an object, the system controller 15 indicates a selection of the multi-pulse to the recording pulse selecting means 21 to achieve the recording. When the recording is made with a high recording fold speed exceeding a preset recording fold speed of 1.5, for example, above 2.0×, the system controller 15 indicates a selection of the rectangular pulse to the recording pulse selecting means 21 to achieve the recording.

Figure 8:
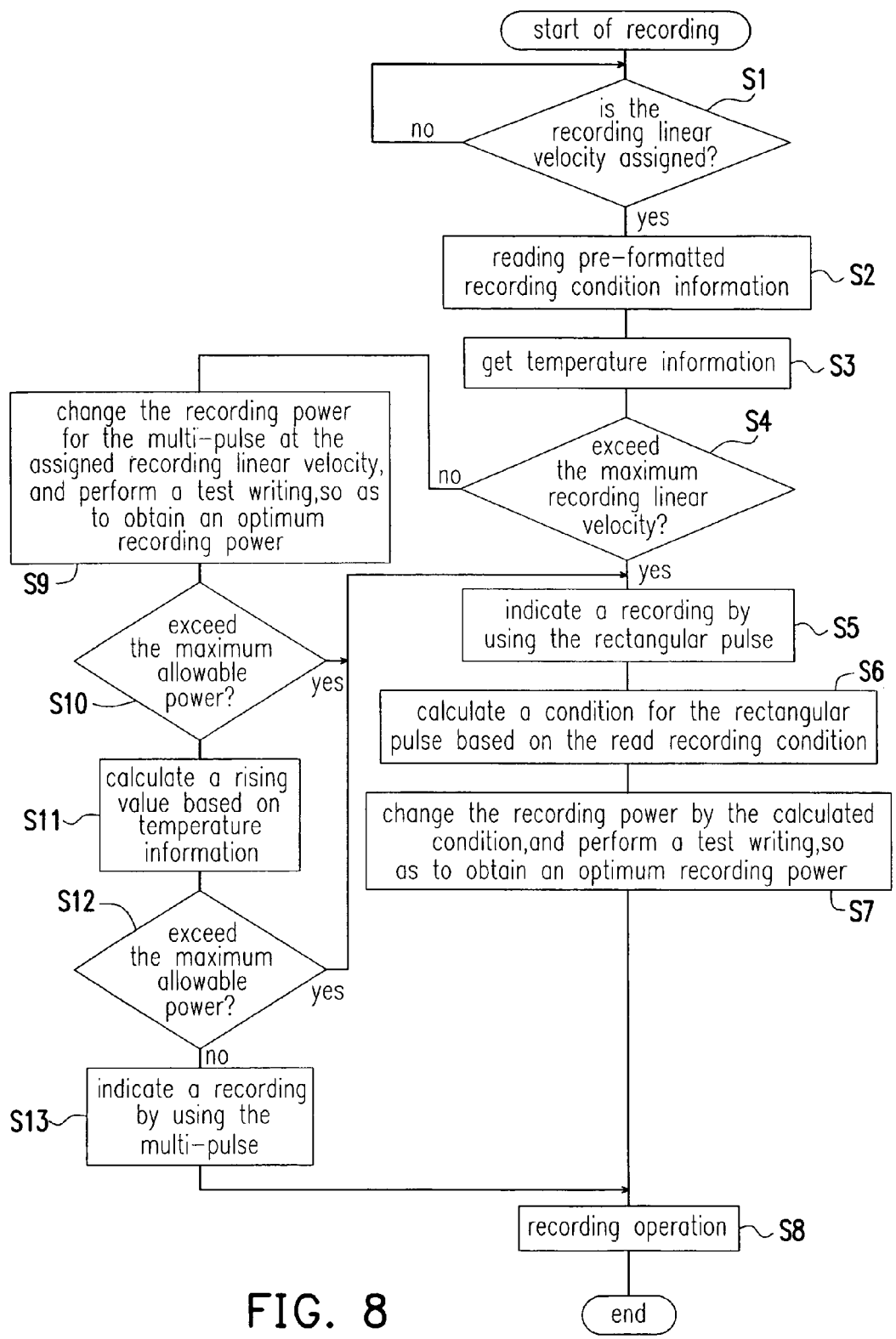
FIG. 8 is a flow chart schematically showing an exemplary process control of a system controller.
Figure 9A:
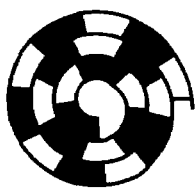
FIGS. 9A to 9D show and explain an conventional recording method for a DVD media.
Figure 9B:
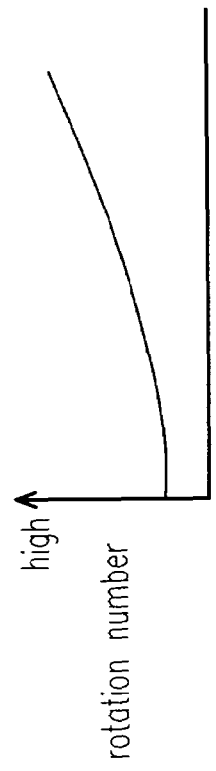
Figure 9C:
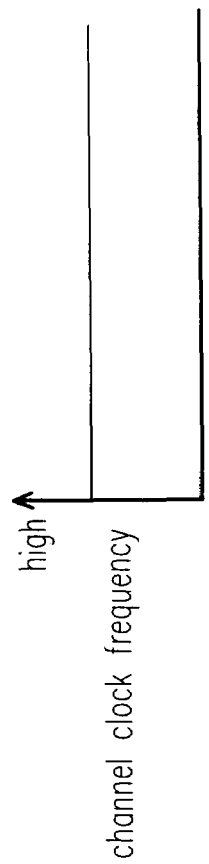
Figure 9D:
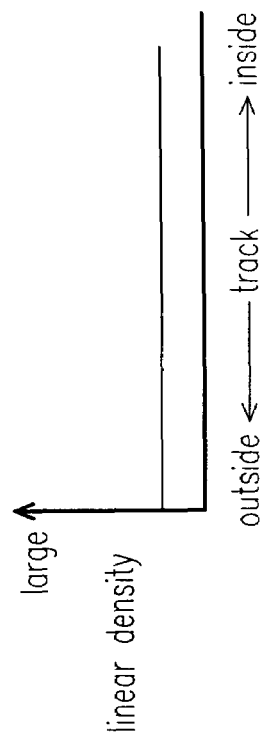

On the other hand, when the recording methods 2 to 4 are used, they are achieved by a process control example as shown in FIG. 8 that is executed by the system controller 15 built in a CPU. During the recording operation, the recording linear velocity is assigned. Next to the assignment of the recording linear velocity (Yes in step S1), the pre-formatted recording condition, consisting of setting values of the pulse width and the recording power of the multi-pulse for the recording linear velocity as a recording condition for each optical recording medium 1, is read out at step S2. Based on the setting values, information of the maximum recording linear velocity using the multi-pulse corresponding to the optical recording medium 1 is acquired. The process of step S2 is executed as functions of recording information acquiring means and a recording condition acquiring means. When a temperature sensor is equipped, temperature information from the temperature sensor 25 is also acquired (step S3).

The recording linear velocity assigned at step S1 is determined whether it exceeds the maximum recording linear velocity obtained by the process of step S2 (step S4). When exceeding the maximum recording linear velocity (Yews at step S4), in place of the recording by using the multi-pulse, to record by using the rectangular pulse is indicated to the recording pulse selecting means 21 (step S5). As receiving the indication, the recording pulse selecting means 21 selects the rectangular pulse, which is generated by the rectangular pulse generating unit 20, as the recording pulse.

During the recording operation with the rectangular pulse, the system controller 15 calculates a condition between the pulse width and the recording power of the rectangular pulse at the assigned recording linear velocity that exceeds the maximum recording linear velocity (step S6), based on the setting values of the pulse width and the recording power of the multi-pulse for the preset recording linear velocity (pre-formatted information) that is read from the optical recording medium 1. The process at step S6 is executed as a function of a rectangular pulse calculating means. Next, based on the calculated result at step S6, a test writing is performed to the PCA area of the optical recording medium 1 using different recording powers at the assigned recording linear velocity of the object (the optical recording medium 1), so as to obtain an optimum recording power for the recording with the rectangular pulse (step S7). The process at step S7 is executed as a function of a rectangular pulse test writing means. Afterwards, the recording by using the rectangular pulse with the optimum recording power obtained at step S7 is performed (step S8).

On the other hand, when the recording linear velocity assigned at step S1 does not exceed the maximum recording linear velocity obtained by the process of step S (No at step S4), basically, the recording is made by directly using the multi-pulse (step S12). But, before the final decision, a test writing is performed to the PCA area using different recording powers in the multi-pulse way at the assigned recording linear velocity, so as to obtain an optimum recording power for the multi-pulse recording (step S9). The process of step S9 is executed as a function of a testing writing means. Next, the optimum recording power obtained at step S9 is determined whether it exceeds the maximum allowable power set by the information recording device (step S10). The process of step S10 is executed as a function of a determining means. When the optimum recording power exceeds the maximum allowable power (Yes at step S10), similar to the above situation, recording by using the rectangular pulse is indicated to the recording pulse selection means 21 (step S5).

When the optimum recording power does not exceed the maximum allowable power (No at step S10, basically), recording by using the multi-pulse is indicated to the recording pulse selecting means 21 (step S13). However, before that, temperature information obtained at step S3 and the optimum recording power obtained at step S9 are used to calculate a rising value that is a level at which the optimum recording power rises based on a temperature difference between a detected temperature and a preset maximum allowable temperature (step S11). The process of step S11 is executed as a function of a recording power rising calculating means. Next, at this time, the optimum recording power added with the rising value calculated by step S11 is determined whether it exceeds the maximum allowable power (step S12). The process of step S12 is executed as a function of the determining means. When the optimum recording power added with the rising value exceeds the maximum allowable power (Yes at step S12), similar to the above situation, recording by using the rectangular pulse is indicated to the recording pulse selecting means 21 (step S5).

When the optimum recording power added with the rising value does not exceed the maximum allowable power (No at step S12), recording by using the multi-pulse is indicated to the recording pulse selecting means 21 (step S13). As receiving the indication, the recording pulse selecting means 21 selects the multi-pulse generated by the multi-pulse generating unit 19, and then the recording by using the multi-pulse with the optimum recording power obtained at step S9 is performed (step S8).

Therefore, according to the information recording device of the embodiment, by using the simple and small-scale circuit structure as described above, even though shifting to the long wavelength side caused by the unevenness of the laser beam wavelength of the semiconductor laser diode (LD) 4 or the rising of the internal temperature of the information recording device, a good recording can be performed with a high speed that exceeds the recommended recording linear velocity of the recording disc of the coloring matter system, without damaging the semiconductor laser diode (LD).

According to one aspect of the invention, in the information recording device, for example, even though the recording condition is a high-speed recording linear velocity where the recording power will be insufficient for recording by the recommended multi-pulse, a very low recording power can be still used by switching to a recording with the rectangular pulse, so that a higher speed recoding can be achieved.

According to another aspect of the invention, in the information recording device, when recording at a range of low recording linear velocity lower than the recording linear velocity preset to the optimum recording medium as an object, the recording is performed with the recommended multi-pulse. However, when recoding with high recording linear velocity higher than the preset recording linear velocity, although the recording power will be insufficient for recording by the recommended multi-pulse, a very low recording power can be still used by switching to a recording with the rectangular pulse, so that a high speed recording that exceeds the recording linear velocity preset to the optimum recording medium can be achieved.

According to an aspect of the invention, in the information recording device, from the recording condition of the pulse width or recording powers for the multi-pulse that are pre-formatted on the optical recording medium as an object, the predetermined maximum recording linear velocity of the optical recording medium is acquired. When recording to the optical recording medium with the high recording linear velocity that exceeds the maximum recording linear velocity, to record with a higher speed is possible by selecting the rectangular pulse to record.

According to an aspect of the invention, in the information recording device, even for the optical recording medium where the preset recording linear velocity is set and the recording condition using the multi-pulse is used, the optimum recording power can be easily and properly calculated for a situation that the rectangular pulse is used and the recording with a much higher recording linear velocity is performed.

According to an aspect of the invention, in the information recording device, for the recording by using the multi-pulse, even though the optimum recording power obtained by recording with the test writing exceeds the maximum allowable power, by switching to the recording with the rectangular pulse, the insufficient power when recording with the multi-pulse is avoided, a low recording power with the rectangular pulse can be used, and an ill recording at high speed recording can be avoided.

According to an aspect of the invention, in the information recording device, considering the temperature near the laser light source in the information recording device, when the recoding sensitivity of the optical recording medium reduces due to the wavelength shift to the long wavelength side, i.e., the temperature dependency of the laser light source, the insufficient power when recording with the multi-pulse can be avoided and an ill recording at high speed recording can be avoided by switching the multi-pulse recording to the rectangular pulse recording.

According to an aspect of the invention, in the information recording device, even though the optimum recording power obtained by the test writing recording is below the maximum allowable power, one can predict that the recording power for the multi-pulse recording will be insufficient because of the reduction of the recording sensitivity of the optical recording medium due to the long wavelength shift cause by the temperature dependency of the laser light source. In this situation, an ill recording at the high-speed recording can be avoided by previously switching to the rectangular pulse recording to use the lower recording power of the rectangular pulse.

According to one aspect of the invention, in the information recording device, the wavelength variation due to the temperature dependency of the laser light source can be properly calculated. The variation of the recording sensitivity due to the wavelength variation of the optical recording medium can be calculated as a variation amount of the recording power. In addition, the rising value corresponding to the optimum recording power obtained by the test writing can be calculated from the detected temperature in the information recording device.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An information recording apparatus for recording information as marks on a recording layer of an optical recording medium by irradiating a laser beam with a light-emission waveform corresponding to a recording pulse, the information recording apparatus comprising:
    a rotation driving mechanism configured to perform a rotation operation so as to rotate the optical recording medium;
    a rotation controlling part configured to control the rotation operation according to a specified recording linear velocity;
    a laser light source configured to emit the laser beam;
    a light source driving part configured to drive the laser light source to emit the laser beam;
    a rectangular pulse calculating part configured to calculate pulse widths and recording powers for a rectangular pulse at a recording linear velocity that exceeds a predetermined recording linear velocity, based on set values of pulse widths and recording powers for a multi-pulse corresponding to the predetermined recording linear velocity for a target optical recording medium that are pre-formatted as a recording condition; and
    a rectangular test write part configured to perform a test write to the optical recording medium with different recording powers at the recording linear velocity based on the recording powers calculated by the rectangular pulse calculating part, so as to acquire an optimum recording power for recording with the rectangular pulse,
    wherein the recording is performed using the rectangular pulse at the optimum recording power acquired by the rectangular test write part, and wherein the rectangular pulse is not a multi-pulse.

2. The information recording apparatus as claimed in claim 1, further comprising:
    a recording pulse generating part configured to generate, as the recording pulse, each of the rectangular pulse comprising a single pulse and the multi-pulse comprising a combination of a leading heating pulse and a succeeding heating pulse; and
    a recording pulse selection part configured to switch between the multi-pulse and the rectangular pulse and to select one of the multi-pulse and the rectangular pulse according to the recording condition, so as to cause the laser light source, via the light source driving part, to emit the laser beam,
    wherein the rectangular pulse calculating part calculates the pulse widths and the recording powers when the rectangular pulse is selected by the recording pulse selection part.

3. The information recording apparatus as claimed in claim 2, wherein the recording condition further comprises the recording linear velocity; and the recording pulse selection part selects the multi-pulse when recording with a low recording linear velocity within a range lower than a preset recording linear velocity that is preset to the target optical recording medium, and selects the rectangular pulse when recording with a high recording linear velocity within a range higher than the preset recording linear velocity.

4. The information recording apparatus as claimed in claim 2, further comprising:
    a velocity information acquiring part configured to acquire a maximum recording linear velocity for the optical recording medium, based on set values of the pulse widths and the recording powers for the multi-pulse corresponding to a predetermined recording linear velocity for the target optical recording medium, which are pre-formatted as the recording condition; and
    wherein the recording condition further comprises a recording linear velocity; and the recording pulse selection part selects the rectangular pulse when recording at a high recording linear velocity that exceeds the maximum recording linear velocity obtained by the velocity information acquiring part.

* * * * *